(12) United States Patent
Yoo et al.

(10) Patent No.: US 10,109,837 B2
(45) Date of Patent: Oct. 23, 2018

(54) SECONDARY BATTERY

(71) Applicant: SAMSUNG SDI CO., LTD., Yongin-si, Gyeonggi-do (KR)

(72) Inventors: Seungyeol Yoo, Yongin-si (KR); Sangwon Byun, Yongin-si (KR); Seokyoon Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 203 days.

(21) Appl. No.: 14/995,131

(22) Filed: Jan. 13, 2016

(65) Prior Publication Data

US 2017/0062791 A1   Mar. 2, 2017

(30) Foreign Application Priority Data

Aug. 25, 2015 (KR) .................. 10-2015-0119491

(51) Int. Cl.
*H01M 2/26* (2006.01)
*H01M 2/30* (2006.01)
(Continued)

(52) U.S. Cl.
CPC .......... *H01M 2/263* (2013.01); *H01M 2/024* (2013.01); *H01M 2/0217* (2013.01);
(Continued)

(58) Field of Classification Search
CPC .................................................. H01M 2/263
See application file for complete search history.

(56) References Cited

U.S. PATENT DOCUMENTS

| 5,849,431 | A | 12/1998 | Kita et al. |
| 6,534,212 | B1* | 3/2003 | Hooke ............... H01M 2/1229 429/186 |

(Continued)

FOREIGN PATENT DOCUMENTS

| EP | 2866280 A1 | 4/2015 |
| KR | 10-0417560 B1 | 4/2004 |

(Continued)

OTHER PUBLICATIONS

EPO Extended Search Report dated Aug. 10, 2016, for corresponding European Patent Application No. 16164782.1 (7 pages).
EPO Office Action dated Aug. 2, 2017, for corresponding European Patent Application No. 16164782.1 (5 pages).

*Primary Examiner* — Jonathan Crepeau
(74) *Attorney, Agent, or Firm* — Lewis Roca Rothgerber Christie LLP

(57) ABSTRACT

A secondary battery includes an electrode assembly including a first uncoated portion extending in a first direction, and a second uncoated portion extending in a second direction opposite to the first direction; a case accommodating the electrode assembly; a first terminal extending to an outside of the case and being connected to the first uncoated portion; a first cover plate coupled to the first terminal and closing the case in the first direction, the first terminal being insulated from the case; a connection plate connected between the second uncoated portion and the case; and a second cover plate covering the connection plate and closing the case in the second direction.

8 Claims, 3 Drawing Sheets

(51) Int. Cl.
*H01M 2/04* (2006.01)
*H01M 2/02* (2006.01)
*H01M 2/06* (2006.01)
*H01M 10/0525* (2010.01)
*H01M 10/04* (2006.01)

(52) U.S. Cl.
CPC ........... *H01M 2/0404* (2013.01); *H01M 2/06* (2013.01); *H01M 2/266* (2013.01); *H01M 2/30* (2013.01); *H01M 2/305* (2013.01); *H01M 10/0525* (2013.01); *H01M 10/04* (2013.01); *H01M 2220/20* (2013.01); *H01M 2220/30* (2013.01)

(56) References Cited

U.S. PATENT DOCUMENTS

| | | | |
|---|---|---|---|
| 7,335,442 B2* | 2/2008 | Nakanishi | H01M 2/263 429/161 |
| 2008/0182166 A1* | 7/2008 | Aota | H01M 2/263 429/122 |
| 2012/0052350 A1 | 3/2012 | Yeh et al. | |
| 2012/0107655 A1* | 5/2012 | Lee | H01M 2/26 429/94 |
| 2013/0004825 A1 | 1/2013 | Kogure | |
| 2013/0316208 A1 | 11/2013 | Yoshiura et al. | |

FOREIGN PATENT DOCUMENTS

| KR | 10-2007-0034221 A | 3/2007 |
|---|---|---|
| KR | 10-2014-0012096 A | 1/2014 |

* cited by examiner

SECONDARY BATTERY

CROSS-REFERENCE TO RELATED APPLICATION

This application claims priority to and the benefit of Korean Patent Application No. 10-2015-0119491, filed on Aug. 25, 2015 in the Korean Intellectual Property Office, the entire content of which is incorporated by reference herein.

BACKGROUND

1. Field

Aspects of embodiments of the present invention relate to a secondary battery.

2. Description of the Related Art

Generally, secondary batteries that are reusable batteries because they can be charged and recharged may be used as a power source for a mobile device, a hybrid vehicle, or an electric vehicle, for example. The secondary battery includes an electrode assembly and a case accommodating the electrode assembly. Here, secondary batteries may be classified into prismatic secondary batteries, pouch secondary batteries, or cylindrical secondary batteries according to the kind of a case used. In addition, an electrode assembly accommodated in the case may be classified into a winding type electrode assembly or a stack type electrode assembly.

SUMMARY

According to an aspect of embodiments of the present invention, a secondary battery is resistant to mechanical vibration or shock.

The above and other aspects and features of the present invention will be described in or will be apparent from the following description of some exemplary embodiments.

According to one or more embodiments of the present invention, a secondary battery includes: an electrode assembly including a first uncoated portion extending in a first direction, and a second uncoated portion extending in a second direction opposite to the first direction; a case accommodating the electrode assembly; a first terminal extending to an outside of the case and being connected to the first uncoated portion; a first cover plate coupled to the first terminal and closing the case in the first direction, the first terminal being insulated from the case; a connection plate connected between the second uncoated portion and the case; and a second cover plate covering the connection plate and closing the case in the second direction.

The secondary battery may further include an insulating plate between the electrode assembly and the connection plate.

The connection plate may be parallel with the second cover plate.

The connection plate may include a major surface perpendicular to the second direction of the second uncoated portion, and a recess at a side of the major surface and allowing the second uncoated portion to pass therethrough.

The connection plate may further include a first flange adjacent the recess and extending toward the second cover plate.

The second uncoated portion may be welded to the first flange by ultrasonic welding, laser welding, or spot welding.

The connection plate may further include a second flange extending from at least one region of the major surface toward the second cover plate, wherein the second flange is welded to the case by ultrasonic welding, laser welding, or spot welding.

The major surface may include a pair of long sides facing each other and a pair of short sides connected to the pair of long sides and facing each other, and the second flange extends from at least one of the long sides or the short sides.

A periphery of the major surface may be in close contact with an inner wall of the case.

The second uncoated portion may be linearly connected to the connection plate without being bent.

The secondary battery may further include a second terminal electrically connected to the first cover plate.

As described above, according to embodiments of the present invention, a secondary battery resistant to a mechanical vibration or a shock is provided. In a secondary battery according to one or more embodiments of the present invention, an uncoated portion is connected to a terminal and/or a connection plate without being bent. Thus, the secondary battery resistant to a mechanical vibration or a shock is provided by allowing the electrode assembly, the case, and the terminals to be moved all together (that is, by allowing the electrode assembly, the case, and the terminals to not be individually moved) when a mechanical vibration or a shock is applied to the secondary battery.

In addition, according to an aspect of embodiments of the present invention, charge current and/or discharge current are allowed to flow through the electrode assembly while completely passing through the electrode assembly, thereby providing the secondary battery that is capable of suppressing deterioration of the electrode assembly, particularly heat generation from the uncoated portion of the electrode assembly. For example, while completely passing through the electrode assembly, the discharge current may flow sequentially in a first terminal, a first uncoated portion, a first electrode plate, a second electrode plate, a second uncoated portion, a connection plate, a case, a first cover plate, and a second terminal in that order. Alternatively, the flowing order of the charge current may be opposite to that of the discharge current. Therefore, since the charge current and/or the discharge current mainly flows through an entire region of the electrode assembly, deterioration of the electrode assembly or heat generation from the electrode assembly can be effectively suppressed.

Further, in the secondary battery according to the present invention, since uncoated portions have a minimized or reduced length, a probability of failures due to the uncoated portions (tabs) during winding and/or notching of the electrode assembly can be reduced. For example, the secondary battery according to the present invention can suppress warpage from occurring to the uncoated portions (tabs) during the winding and/or the notching. Additionally, the bending of the uncoated portion (tab) may not be necessarily performed, thereby providing the secondary battery having improved manufacturability.

BRIEF DESCRIPTION OF THE DRAWINGS

The above and other features of the present invention will become more apparent by describing in further detail some exemplary embodiments thereof with reference to the attached drawings, in which.

DETAILED DESCRIPTION

Figure 1:
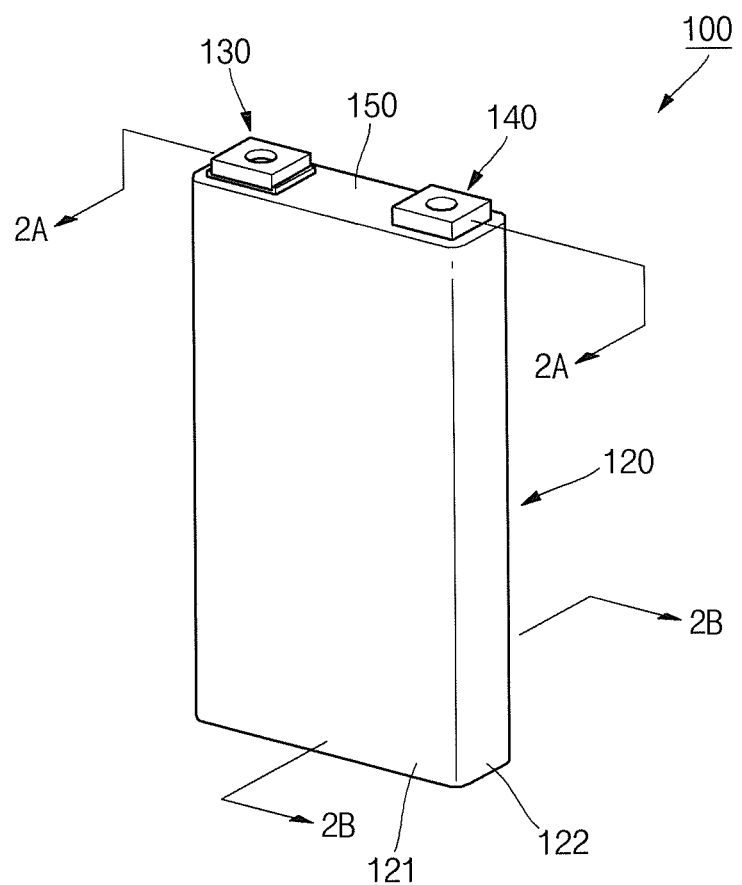
FIG. 1 is a perspective view of a secondary battery according to an embodiment of the present invention.

Hereinafter, some exemplary embodiments of the present invention will be described in further detail with reference to the accompanying drawings such that they can easily be made and used by those skilled in the art.

The present invention may, however, be embodied in many different forms and should not be construed as being limited to the embodiments set forth herein. As those skilled in the art would realize, the described embodiments may be modified in various different ways, all without departing from the spirit or scope of the present invention. Accordingly, the drawings and description are to be regarded as illustrative in nature and not restrictive.

In the drawings, the thicknesses of layers and regions may be exaggerated for clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B, or an intervening element C may be present between the elements A and B such that the element A may be indirectly connected to the element B.

In addition, the terminology used herein is for the purpose of describing particular embodiments only and is not intended to be limiting of the present invention. As used herein, the singular forms are intended to include the plural forms as well, unless the context clearly indicates otherwise. It will be further understood that the terms "comprises" or "includes" and/or "comprising" or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," etc. may be used herein to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer and/or a first section discussed below could be termed a second member, a second element, a second region, a second layer and/or a second section without departing from the teachings.

Spatially relative terms, such as "beneath," "below," "lower," "above," "upper," and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

Figure 2A:
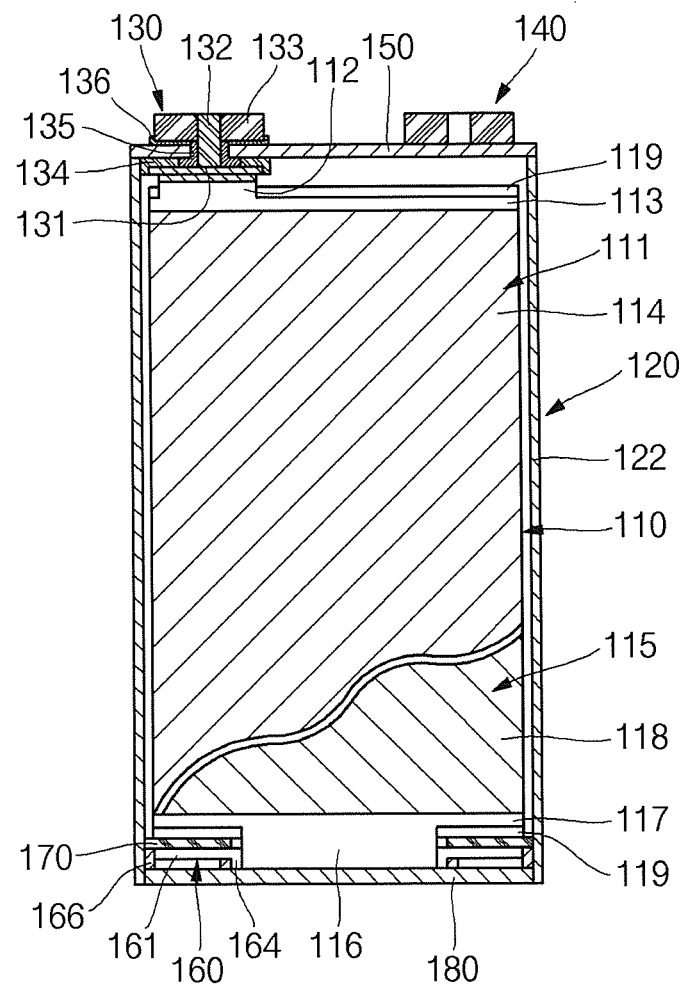
FIG. 2A is a sectional view of the secondary battery of FIG. 1, taken along the line 2A-2A.
Figure 2B:
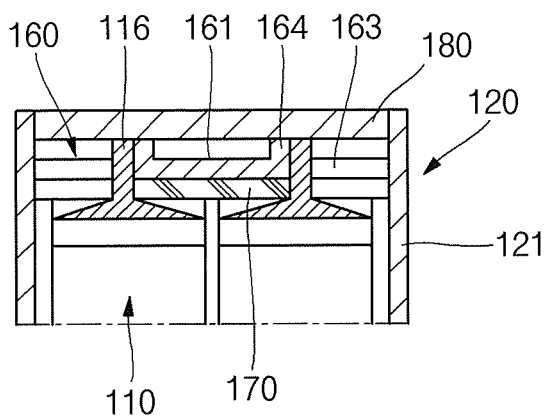
FIG. 2B is a partial sectional view of the secondary battery of FIG. 1, taken along the line 2B-2B.

FIG. 1 is a perspective view of a secondary battery 100 according to an embodiment of the present invention; FIG. 2A is a sectional view of the secondary battery 100, taken along the line 2A-2A of FIG. 1; and FIG. 2B is a sectional view of the secondary battery 100, taken along the line 2B-2B of FIG. 1. FIG. 2B illustrates a state in which the secondary battery 100 is overturned.

Referring to FIGS. 1 to 2B, the secondary battery 100 according to an embodiment of the present invention includes an electrode assembly 110, a case 120, a first terminal 130, a second terminal 140, a first cover plate 150, a connection plate 160, an insulating plate 170, and a second cover plate 180.

The electrode assembly 110 may have a first uncoated portion 112 extending in a first direction (e.g., upward) and a second uncoated portion 116 extending in a second direction (e.g., downward) opposite to the first direction. The electrode assembly 110 may be provided in plural as a pair of electrode assemblies disposed to be parallel with each other, and each of the pair of electrode assemblies 110 may include a first uncoated portion 112 extending in a first direction and a second uncoated portion 116 extending in a second direction.

One of the pair of electrode assemblies 110 will now be described in more detail.

The electrode assembly 110 may include a first electrode plate 111, the first uncoated portion 112 extending in a first direction from the first electrode plate 111, a second electrode plate 115, the second uncoated portion 116 extending in a second direction from the second electrode plate 115, and a separator 119 interposed between the first and second electrode plates 111 and 115.

The first electrode plate 111 may be formed by coating a first electrode active material 114, e.g., graphite or carbon, on a first current collector 113 made of a metal foil, e.g., a copper or nickel foil. The first electrode plate 111 may include the first uncoated portion 112 of the first current collector 113 (that is, a portion that is not coated with the first electrode active material 114) extending and protruding toward the first terminal 130. The extending and protruding first uncoated portion 112 may be defined as a first tab, for example. In order to manufacture the electrode assembly 110, the first uncoated portion 112 may be aligned at a position (e.g., a predetermined position) during winding, thereby forming a multi-tab structure. The first uncoated portion 112 is electrically connected to the first terminal 130, and the first uncoated portion 112 may correspond to a path of current flow between the first electrode plate 111 and the first terminal 130.

The second electrode plate 115 may be formed by coating a second electrode active material 118, e.g., a transition metal oxide, on a second current collector 117 made of a metal foil, e.g., an aluminum foil. The second electrode plate 115 may include the second uncoated portion 116 of the second current collector 117 (that is, a portion that is not coated with the second electrode active material 118) extending and protruding toward the connection plate 160. The extending and protruding second uncoated portion 116 may be defined as a second tab, for example. In order to manufacture the electrode assembly 110, the second uncoated portion 116 may be aligned at a position (e.g., a predetermined position) during winding, thereby forming a multi-tab structure. The second uncoated portion 116 is electrically connected to the connection plate 160 and is then electrically connected to the case 120, the first cover plate 150, and the second terminal 140. Accordingly, the second uncoated portion 116 may correspond to a path of current flow between the second electrode plate 115 and the second terminal 140.

The separator 119, located between the first and second electrode plates 111 and 115, may prevent or substantially prevent a short circuit between the first and second electrode plates 111 and 115, and may allow lithium ions to freely move. The separator 119 may have a slightly larger width than the first electrode plate 111 and the second electrode plate 115, such that the separator 119 protrudes more than the first electrode plate 111 and the second electrode plate 115 in the first and second directions (e.g., upward and downward). Therefore, the separator 119 may prevent the first electrode plate 111 and the second electrode plate 115 from directly contacting the case 120, the first cover plate 150 and/or the second cover plate 180 in the first and second directions of the electrode assembly 110.

The first electrode plate 111 may function as a negative electrode and the second electrode plate 115 may function as a positive electrode, or vice versa.

The electrode assembly 110 may include at least one to four electrode assemblies, for example, which are positioned to be parallel with one another to then be stacked one on another. In one embodiment, as illustrated in FIG. 2B, the electrode assembly 110 may include two electrode assemblies 110.

The case 120 may accommodate the electrode assembly 110. In one embodiment, the case 120 may include a pair of long sides 121 facing each other, and a pair of short sides 122 connected to the pair of long sides 121 and facing each other. In addition, the case 120 may be open therethrough in the first and second directions. Therefore, the electrode assembly 110 having a hexahedral shape, for example, may be accommodated within the case 120. The case 120 may be made of a conductive metal, such as aluminum, an aluminum alloy, or nickel-plated steel, and may be defined as a can, for example. Top and bottom ends of the case 120 may be finally plugged or closed by the first cover plate 150 and the second cover plate 180, respectively.

A lower region of the first terminal 130 may be connected to the first uncoated portion 112, and an upper region of the first terminal 130 may extend to the outside of the case 120. In one embodiment, the first terminal 130 may be connected to the first cover plate 150 in an insulated state, the first uncoated portion 112 may be connected to the lower region of the first terminal 130, and the upper region of the first terminal 130 having a generally hexahedral shape, for example, may be positioned on the first cover plate 150. In one embodiment, the first terminal 130 may include a lower terminal plate 131, a conductive pin 132, and an upper terminal plate 133. The lower terminal plate 131 may be coupled to the conductive pin 132 while being electrically connected to the first uncoated portion 112. In addition, the lower terminal plate 131 may be electrically insulated from the first cover plate 150 by a lower insulation member 134. The conductive pin 132 may pass through the first cover plate 150 to upwardly extend. After being coupled to the upper terminal plate 133, the conductive pin 132 may be riveted. The conductive pin 132 may be surrounded by a seal gasket 135 to be insulated from the first cover plate 150. In addition, the upper terminal plate 133 may be insulated from the first cover plate 150 by an upper insulation member 136. In one embodiment, the lower terminal plate 131 may be made of copper or nickel, the upper terminal plate 133 may be made of aluminum or an aluminum alloy, and the conductive pin 132 may be made of copper, nickel, aluminum, or an aluminum alloy, for example.

The second terminal 140 may be located at a region spaced apart from the first terminal 130. In one embodiment, the second terminal 140 may have a shape similar to that of the first terminal 130 and may be electrically connected to the first cover plate 150. That is, the second terminal 140 may be welded to the first cover plate 150 by ultrasonic welding, laser welding, and/or spot welding. In one embodiment, the second terminal 140 may be made of aluminum or an aluminum alloy, for example.

That is, according to an embodiment of the present invention, the first terminal 130 may be electrically insulated from the first cover plate 150 while the second terminal 140 may be electrically connected to the first cover plate 150.

The first cover plate 150 may plug the case 120 in the first direction and may be coupled to the case 120 while being insulated from the first terminal 130 and electrically coupled to the second terminal 140. That is, in one embodiment, the first cover plate 150 may be welded to the top end of the case 120 by ultrasonic welding, laser welding, and/or spot welding, thereby plugging the top portion of the case 120. Moreover, the first terminal 130 and the second terminal 140 may be stably positioned. The first cover plate 150, in one embodiment, may be made of a same material with the case 120, for example, a conductive metal, such as aluminum, an aluminum alloy, or nickel-plated steel.

The connection plate 160 may be installed to be substantially parallel with the second cover plate 180 and may electrically connect the second uncoated portion 116 of the electrode assembly 110 and the case 120 to each other. That is, the second uncoated portion 116 may be connected to an end of the connection plate 160, and the other end of the connection plate 160 may be connected to the case 120. The connection plate 160 may correspond to a path of current flow between the second uncoated portion 116 of the electrode assembly 110 and the case 120. The connection plate 160 may be installed between the electrode assembly 110 and the second cover plate 180 and may be positioned within the case 120. In addition, the connection plate 160 may be made of a same metal material as the second uncoated portion 116, for example, aluminum or an aluminum alloy.

The connection plate 160, according to one or more embodiments of the present invention, will now be described in further detail.

Figure 3A:
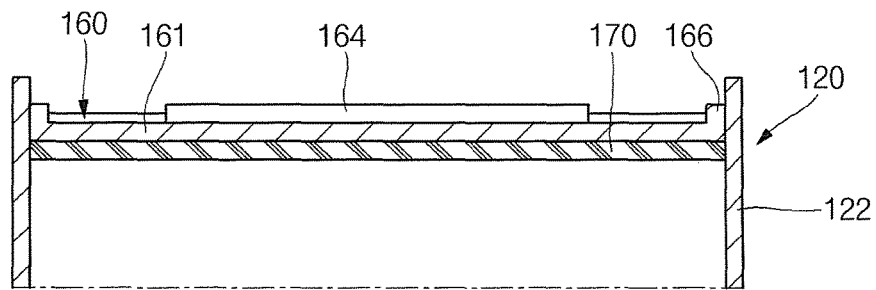
FIG. 3A is a partial sectional view illustrating a connection plate of the secondary battery shown in FIG. 1.
Figure 3B:
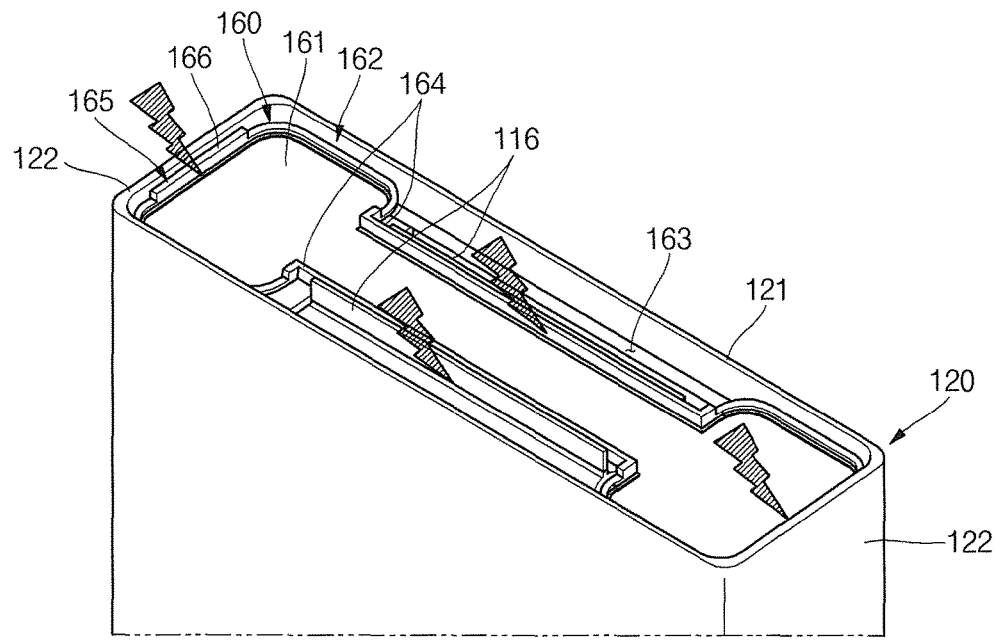
FIG. 3B is a partial perspective view illustrating a connection structure of uncoated portions of an electrode assembly of the secondary battery of FIG. 1 and the connection plate shown in FIG. 3A, and a connection structure of the connection plate and a case of the secondary battery.

The connection plate 160 is substantially perpendicular to the second direction in which the second uncoated portion 116 extends and may include a major surface 161 that is substantially planar and a recess 163 formed in a region of the major surface 161 to allow the second uncoated portion 116 to pass therethrough or be received therein (see FIG. 3B). In one embodiment, the major surface 161 may include peripheries of a pair of long sides 162 facing each other and peripheries of a pair of short sides 165 connected to the pair of long sides 162 and facing each other. The recess 163 may be formed on the long sides 162 and/or the short sides 165. The second uncoated portion 116 may be welded to the connection plate 160 in the recess 163 by ultrasonic welding, laser welding, and/or spot welding, for example. Therefore, the second uncoated portion 116 may be substantially linearly connected to the connection plate 160 without being bent. In the embodiment illustrated in FIG. 3B, the recess 163 is formed on the long sides 162 of the major surface 161 of the connection plate 160.

In addition, at least a portion of the periphery of the major surface 161 may be welded to the case 120 by ultrasonic welding, laser welding, and/or spot welding, for example. That is, the major surface 161 may include peripheries of a pair of long sides 162 facing each other and peripheries of a pair of short sides 165 connected to the pair of long sides 162 and facing each other. The long sides 162 or/and the short sides 165 may be welded to the case 120 by ultrasonic welding, laser welding, and/or spot welding, for example. In one embodiment, as shown in FIG. 3B, the short sides 165 of the connection plate 160 are welded to the case 120.

The connection plate 160, that is, the peripheries of the major surface 161, may be brought into close contact with an inner wall of the case 120. In such a manner, the connection plate 160 may electrically connect the second uncoated portion 116 of the electrode assembly 110 and the case 120 to each other. However, at a location of the recess 163, the major surface 161 may not be brought into close contact with the inner wall of the case 120, but may be spaced apart by a distance (e.g., a predetermined distance) from the inner wall of the case 120, thereby allowing the second uncoated portion 116 to be easily positioned in the recess 163.

In one embodiment, in order to improve electrical connection reliability, the connection plate 160 may further include a flange, such as a plurality of flanges, extending by a length (e.g., a predetermined length) in the second direction and/or toward the second cover plate 180. In one embodiment, a first flange 164 may be formed in or adjacent to the recess 163 of the connection plate 160, and a second flange 166 may be formed on the short side 165. In one embodiment, the first flange 164 of the connection plate 160 may be substantially parallel with the long sides 121 of the case 120. In addition, the second uncoated portion 116 and the first flange 164 may be positioned to be parallel with each other. Further, the second flange 166 of the connection plate 160 may be substantially parallel with the short sides 122 of the case 120. Accordingly, in one embodiment, the first flange 164 and the second flange 166 may be positioned to be perpendicular with each other.

The second uncoated portion 116 may be welded to the first flange 164 by ultrasonic welding, laser welding, and/or spot welding. As described above, since the second uncoated portion 116 and the first flange 164 are positioned to be parallel with each other, the second uncoated portion 116 may be easily welded to the first flange 164. In addition, the second flange 166 may be welded to the short sides 122 of the case 120 by ultrasonic welding, laser welding, and/or spot welding. As described above, since the second flange 166 and the short sides 122 of the case 120 are positioned to be parallel with each other, the second flange 166 may be easily welded to the short sides 122 of the case 120.

In addition, the first flange 164 and the second flange 166 may mechanically contact the second cover plate 180 to be described further later, or may be spaced apart by a distance (e.g., a predetermined distance) from the second cover plate 180.

The connection plate 160, in one embodiment, may be made of aluminum, an aluminum alloy, or equivalents thereof, like the second uncoated portion 116 and the case 120. Therefore, the second uncoated portion 116 may be easily welded to the connection plate 160, and the connection plate 160 may be easily welded to the case 120. However, if the second uncoated portion 116, the connection plate 160, and the case 120 are made of different materials, welding of the second uncoated portion 116, the connection plate 160, and the case 120 may be more difficult.

The insulating plate 170 may be installed between the electrode assembly 110 and the connection plate 160. Since the insulating plate 170 is installed between the electrode assembly 110 and the connection plate 160, a short circuit between the connection plate 160 and the first electrode plate 111 may be prevented or substantially prevented. In one embodiment, a penetrating hole may be formed in the insulating plate 170 to allow the second uncoated portion 116 to pass therethrough. The insulating plate 170 may be made of a material selected from the group consisting of polypropylene, polyethylene and equivalents thereof, but is not limited thereto.

The second cover plate 180 may plug the case 120 in the second direction and may cover the connection plate 160. In one embodiment, the second cover plate 180 may be welded to the bottom end of the case 120 by ultrasonic welding, laser welding, or spot welding, for example, thereby plugging the bottom portion of the case 120. The second cover plate 180, in one embodiment, may be made of a same material as the case 120, for example, a conductive metal, such as aluminum, an aluminum alloy, or nickel-plated steel.

As described above, in the secondary battery 100 according to an embodiment of the present invention, the first uncoated portion 112 and the second uncoated portion 116 are electrically connected to the first terminal 130 and the connection plate 160, respectively, without being bent. That is, in the secondary battery 100 according to an embodiment of the present invention, the first uncoated portion 112 is linearly connected to the first terminal 130, and the second uncoated portion 116 is also linearly connected to the connection plate 160 without being bent. Here, the connection plate 160 may be electrically connected to the second terminal 140 through the case 120 and the first cover plate 150. Therefore, when mechanical vibration or shock is applied to the secondary battery 100, the electrode assembly 110, the case 120, and the first and second terminals 130 and 140 are moved all together, that is, the electrode assembly 110, the case 120, and the first and second terminals 130 and 140 are not individually moved. Accordingly, the secondary battery 100 according to an embodiment of the present invention may be resistant against the mechanical vibration or shock applied thereto.

In addition, according to an embodiment of the present invention, charge current and/or discharge current are allowed to flow through the electrode assembly 110 while completely passing through the electrode assembly 110, thereby providing the secondary battery 100 capable of suppressing deterioration of the electrode assembly 110, particularly heat generation from the first uncoated portion 112 and/or the second uncoated portion 116 of the electrode assembly 110. For example, while completely passing through the electrode assembly 110, the discharge current flows sequentially in the first terminal 130, the first uncoated portion 112, the first electrode plate 111, the second electrode plate 115, the second uncoated portion 116, the connection plate 160, the case 120, the first cover plate 150, and the second terminal 140 in that order. Alternatively, while completely passing through the electrode assembly 110, the charge current may flow sequentially in the second terminal 140, the first cover plate 150, the case 120, the connection plate 160, the second uncoated portion 116, the second electrode plate 115, the first electrode plate 111, the first uncoated portion 112 and the first terminal 130 in that order. Therefore, since the charge current and/or the discharge current mainly flows through an entire region of the electrode assembly 110, deterioration of the electrode assembly 110 or heat generation from the electrode assembly 110 can be efficiently suppressed.

Further, in the secondary battery 100 according to an embodiment of the present invention, since the first and second uncoated portions 112 and 116 have a minimized or reduced length, a probability of failures due to the uncoated portions (e.g., tabs) 112 and 116 during winding and/or notching of the electrode assembly 110 (the uncoated portions 112 and 116 may be in the forms of protrusions, or tabs, by cutting) can be reduced. For example, the secondary battery 100 according to the present invention can suppress warpage from occurring to the uncoated portions (e.g., tabs) 112 and 116 during the winding and/or the notching. Additionally, the bending of the uncoated portions (e.g., tabs) may not be necessarily performed, thereby providing the secondary battery 100 having improved manufacturability.

FIG. 3A is a partial sectional view illustrating the connection plate 160 in the secondary battery 100; and FIG. 3B is a partial perspective view illustrating a connection structure of the second uncoated portions 116 of two electrode assemblies 110 and the connection plate 160, and a connection structure of the connection plate 160 and the case 120. For brevity, the electrode assembly 110 is not illustrated in FIG. 3A.

As illustrated in FIGS. 3A and 3B, in one embodiment, the connection plate 160 may include two recesses 163 inwardly recessed by a depth (e.g., a predetermined depth) at peripheries of the two long sides 162 facing each other, and two first flanges 164 extending toward the second cover plate 180 or in a second direction may be formed in or adjacent to the two recesses 163, respectively. In one embodiment, the first flanges 164 may be formed to be substantially parallel with the long sides 121 of the case 120. In addition, the second uncoated portions 116 respectively provided in two electrode assemblies 110 are positioned in the recesses 163 and are connected to the first flanges 164 by ultrasonic welding, laser welding, and/or spot welding, for example.

In addition, peripheries of two short sides 165 of the connection plate 160, facing each other, may be welded to the short sides 122 of the case 120. Alternatively, peripheries of the two long sides 162 of the connection plate 160, facing each other, may be welded to the long sides 162 of the case 120. Additionally, the peripheries of the two short sides 165 of the connection plate 160, facing each other, and the peripheries of the two long sides 162 of the connection plate 160, facing each other, may be all welded to the short sides 122 and the long sides 121 of the case 120.

In one embodiment, for example, the second flanges 166 may be provided on the peripheries of the two short sides 165 of the connection plate 160 and may be welded to the short sides 122 of the case 120 by ultrasonic welding, laser welding, and/or spot welding. Here, the second flanges 166 of the connection plate 160 may be formed to be substantially parallel with the short sides 122 of the case 120.

In addition, since the second cover plate 180 is coupled to the case 120, the electrode assembly 110 and the connection plate 160 can be protected from external circumstances.

As described above, the second uncoated portions 116 of the electrode assembly 110 may be connected to regions of the connection plate 160 (e.g., the first flanges 164), and the case 120 may be electrically connected to another region of the connection plate 160 (e.g., the second flange 166), thereby allowing the connection plate 160 to electrically connect the electrode assembly 110 and the case 120 to each other. Therefore, according to an embodiment of the present invention, extended lengths of the second uncoated portions 116 of the electrode assembly 110 can be minimized or reduced. That is, it is not necessary to extend lengths of the second uncoated portions 116 up to a second cover plate. Therefore, during the manufacturing process of the electrode assembly 110, warpage of uncoated portions (e.g., tabs) can be suppressed, thereby easily performing winding and notching of the electrode assembly 110. Additionally, according to an embodiment of the present invention, bending of the uncoated portion is not necessarily performed, and the manufacturing process may be simplified.

Further, according to an embodiment of the present invention, depths of the recesses 163 of the connection plate 160 may be adjusted according to thicknesses of the second uncoated portions 116, and the second uncoated portions 116 varying in thicknesses can be easily welded to the connection plate 160, that is, to the first flanges 164. For example, if the second uncoated portions 116 are relative thick, depths of the recesses 163 may be increased. However, if the second uncoated portions 116 are relatively thin, depths of the recesses 163 may be decreased. In such a manner, the second uncoated portions 116 may be easily accommodated in the recesses 163.

In FIG. 3B, symbols having the appearance of lightning indicate portions subjected to ultrasonic welding, laser welding, and/or spot welding. As the result of such welding, the second uncoated portions 116 may be connected to the first flanges 164 of the connection plate 160, and the second flange 166 of the connection plate 160 may be connected to the case 120.

While the secondary battery of the present invention has been particularly shown and described with reference to some exemplary embodiments thereof, it will be understood by those of ordinary skill in the art that various changes in form and details may be made therein without departing from the spirit and scope of the present invention as defined by the following claims and equivalents thereof.

What is claimed is:

1. A secondary battery comprising:
    an electrode assembly comprising a first uncoated portion extending in a first direction, and a second uncoated portion extending in a second direction opposite to the first direction;
    a case accommodating the electrode assembly;
    a first terminal extending to an outside of the case and being connected to the first uncoated portion;
    a first cover plate coupled to the first terminal and closing the case in the first direction, the first terminal being insulated from the case;
    a connection plate connected between the second uncoated portion and the case and including a recess, an end of the second uncoated portion in the second direction that is unbent being received in the recess and welded to the connection plate; and
    a second cover plate covering the connection plate and closing the case in the second direction,
    wherein the connection plate comprises:
    a major surface perpendicular to the second direction of the second uncoated portion; and
    the recess at a side of the major surface and allowing the second uncoated portion to pass therethrough,
    the connection plate further comprises a first flange adjacent the recess and extending toward the second cover plate, and
    the second uncoated portion is welded to the first flange by ultrasonic welding, laser welding, or spot welding.

2. The secondary battery of claim 1, further comprising an insulating plate between the electrode assembly and the connection plate.

3. The secondary battery of claim 1, wherein the connection plate is parallel with the second cover plate.

4. A secondary battery comprising:
an electrode assembly comprising a first uncoated portion extending in a first direction, and a second uncoated portion extending in a second direction opposite to the first direction;
a case accommodating the electrode assembly;
a first terminal extending to an outside of the case and being connected to the first uncoated portion;
a first cover plate coupled to the first terminal and closing the case in the first direction, the first terminal being insulated from the case;
a connection plate connected between the second uncoated portion and the case and including a recess, an end of the second uncoated portion in the second direction that is unbent being received in the recess and welded to the connection plate; and
a second cover plate covering the connection plate and closing the case in the second direction,
wherein the connection plate comprises:
a major surface perpendicular to the second direction of the second uncoated portion; and
the recess at a side of the major surface and allowing the second uncoated portion to pass therethrough,
wherein the connection plate further comprises a second flange extending from at least one region of the major surface toward the second cover plate, wherein the second flange is welded to the case by ultrasonic welding, laser welding, or spot welding.

5. The secondary battery of claim 4, wherein the major surface includes a pair of long sides facing each other and a pair of short sides connected to the pair of long sides and facing each other, and the second flange extends from at least one of the long sides or the short sides.

6. The secondary battery of claim 1, wherein a periphery of the major surface is in close contact with an inner wall of the case.

7. The secondary battery of claim 1, wherein the second uncoated portion is linearly connected to the connection plate without being bent.

8. A secondary battery comprising:
an electrode assembly comprising a first uncoated portion extending in a first direction, and a second uncoated portion extending in a second direction opposite to the first direction;
a case accommodating the electrode assembly;
a first terminal extending to an outside of the case and being connected to the first uncoated portion;
a first cover plate coupled to the first terminal and closing the case in the first direction, the first terminal being insulated from the case;
a connection plate connected between the second uncoated portion and the case;
a second cover plate covering the connection plate and closing the case in the second direction; and
a second terminal electrically connected to the first cover plate.

* * * * *